US010244131B2

(12) United States Patent
Sadakuni

(10) Patent No.: US 10,244,131 B2
(45) Date of Patent: Mar. 26, 2019

(54) DISPLAY APPARATUS AND SERVER

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Takayuki Sadakuni, Numazu Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/671,241

(22) Filed: Aug. 8, 2017

(65) Prior Publication Data
US 2017/0339285 A1    Nov. 23, 2017

Related U.S. Application Data

(62) Division of application No. 15/006,315, filed on Jan. 26, 2016, now Pat. No. 9,762,761.

(51) Int. Cl.
*H04N 1/00* (2006.01)
*G02B 27/01* (2006.01)

(52) U.S. Cl.
CPC ....... *H04N 1/0044* (2013.01); *H04N 1/00328* (2013.01); *H04N 1/00411* (2013.01); *H04N 1/00875* (2013.01); *G02B 27/017* (2013.01); *G02B 2027/0178* (2013.01); *H04N 2201/0075* (2013.01); *H04N 2201/0094* (2013.01)

(58) Field of Classification Search
CPC .................................................. H04N 1/0044
USPC ....................................................... 358/1.15
See application file for complete search history.

(56) References Cited

U.S. PATENT DOCUMENTS

| | | | |
|---|---|---|---|
| 2007/0188823 A1 | 8/2007 | Koide | |
| 2007/0250529 A1 | 10/2007 | Beato et al. | |
| 2010/0097656 A1 | 4/2010 | Misawa et al. | |
| 2013/0113892 A1* | 5/2013 | Nakamaru | G03B 35/18 348/47 |
| 2015/0161099 A1* | 6/2015 | Lee | G06F 17/275 345/171 |
| 2015/0199849 A1* | 7/2015 | Cho | G06T 19/006 345/633 |

(Continued)

FOREIGN PATENT DOCUMENTS

JP    2015-095704    5/2015

OTHER PUBLICATIONS

Non-Final Office Action for U.S. Appl. No. 15/006,315 dated Jan. 12, 2017.

*Primary Examiner* — Jacky X Zheng
(74) *Attorney, Agent, or Firm* — Amin, Turocy & Watson LLP

(57) ABSTRACT

In general, an image forming apparatus according to the present embodiment comprises an image forming section, a reading section and a controller. The image forming section forms an image on a sheet. The reading section reads the image on the sheet to generate scan image information. The controller generates background image information obtained by excluding extraction image information from the scan image information and forms the background image information, first identification information of the sheet and orientation information indicating orientation of the sheet on the sheet through the image forming section.

6 Claims, 2 Drawing Sheets

(56) References Cited

U.S. PATENT DOCUMENTS

2015/0269782 A1\* 9/2015 Tamura ................ G06T 19/006
                                                                            345/633

\* cited by examiner

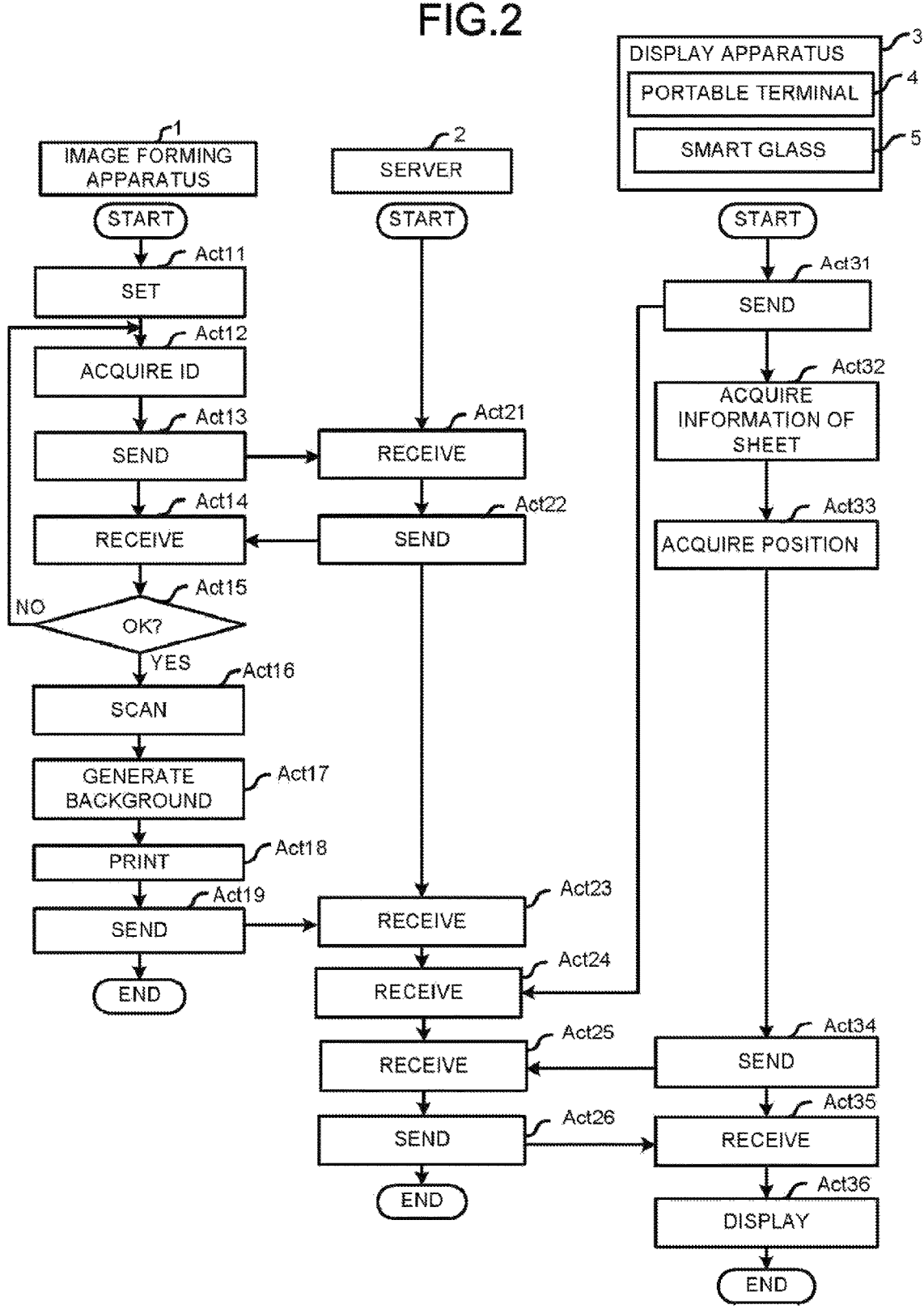

DISPLAY APPARATUS AND SERVER

CROSS-REFERENCE TO RELATED APPLICATIONS

This application is a Divisional of application Ser. No. 15/006,315 filed Jan. 26, 2016, the entire contents of which are incorporated herein by reference.

FIELD

Embodiments described herein relate generally to a technology of cooperating with a smart glass in print.

BACKGROUND

In recent years, smart glass serving as an eyeglass-type wearable device is being developed and commodified. In a state in which supplementary information such as images, characters and the like is overlapped with outside scene, a user can confirm the supplementary information by sight with the smart glass.

In an image forming apparatus, it is desired to develop a convenient technology capable of cooperating with the smart glass.

DESCRIPTION OF THE DRAWINGS

FIG. 2 is a flowchart illustrating the procedures of a display processing carried out by the display system.

DETAILED DESCRIPTION

Figure 1:
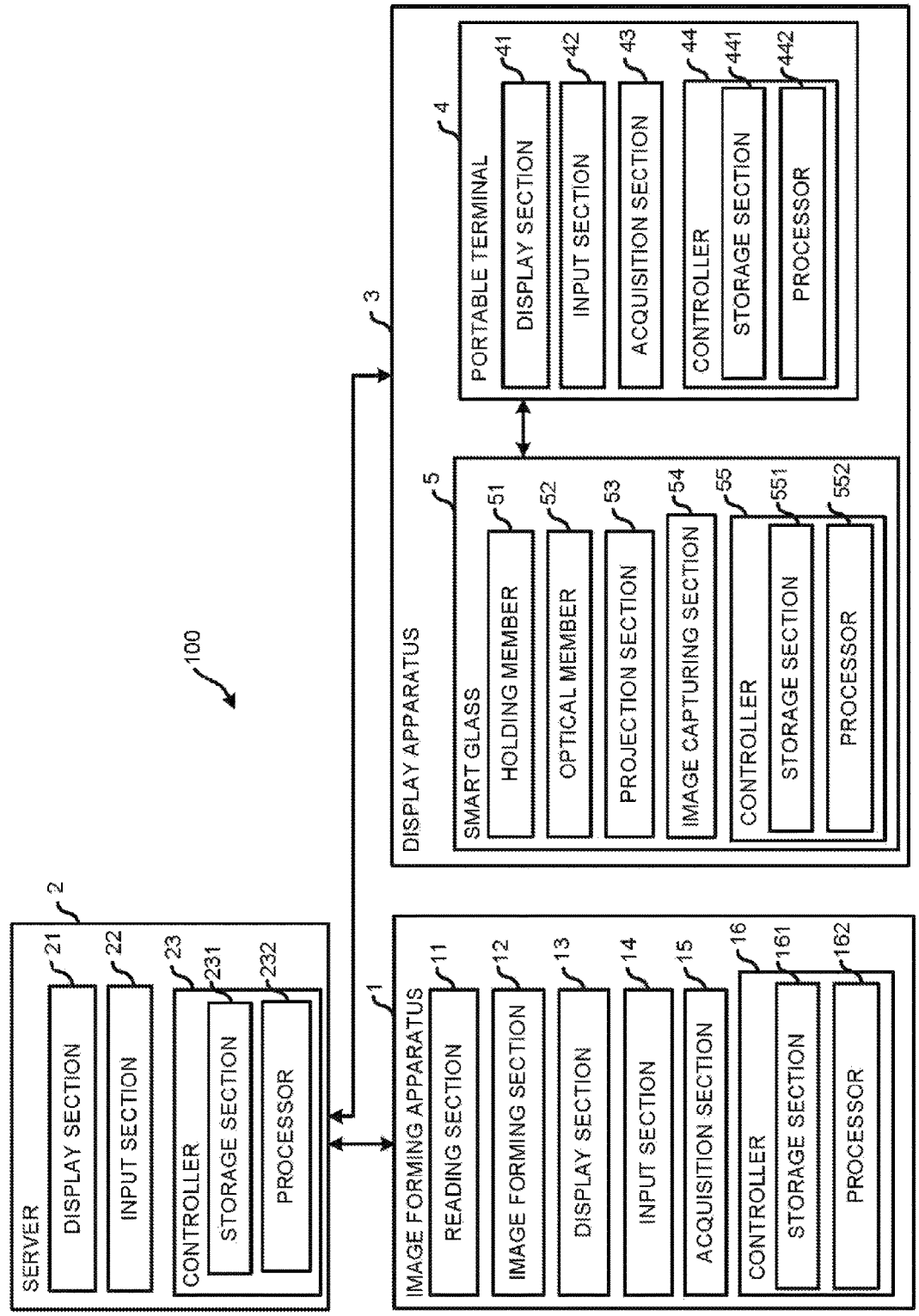
FIG. 1 is a block diagram illustrating the structure of a display system.

In general, an image forming apparatus according to the present embodiment comprises an image forming section, a reading section and a controller. The image forming section forms an image on a sheet. The reading section reads the image on the sheet to generate scan image information. The controller generates background image information obtained by excluding extraction image information from the scan image information and forms the background image information, first identification information of the sheet and orientation information indicating orientation of the sheet on the sheet through the image forming section.

Hereinafter, the embodiment is described with reference to the accompanying drawings.

FIG. 1 is a block diagram illustrating the structure of a display system 100.

The display system 100 is provided with an image forming apparatus 1, a server 2 and a display apparatus 3. Communication is carried out between the image forming apparatus 1 and the server 2, for example, in a wired manner. Communication is carried out between the server 2 and the display apparatus 3, for example, in a wireless manner.

The image forming apparatus 1 is an MFP (Multi-Function Peripheral) with a plurality of functions such as a copy function, a print function, a scan function and a FAX function. The image forming apparatus 1 is provided with a reading section 11, an image forming section 12, a display section 13, an input section 14, an acquisition section 15 and a controller 16. The reading section 11 includes a CCD (Charge Coupled Device) for R (red), a CCD for G (green) and a CCD for B (blue) that respectively read amount of light in R, G and B wavelength regions. The reading section 11 reads an image on a sheet to generate scan image information. The image forming section 12 forms the image on the sheet with toner or ink. The display section 13 which is, for example, a touch panel displays setting information of the image forming apparatus 1. The input section 14 which is, for example, a touch panel receives input of a user. The acquisition section 15 which is, for example, a card reader for reading an ID (Identification) card of the user acquires identification information of the user. The acquisition section 15 may acquire identification information of the user on the basis of a user name and a password input into the input section 14. The controller 16 controls the whole of the image forming apparatus 1. The controller 16 includes a storage section 161 and a processor 162.

The server 2 is provided with a display section 21, an input section 22 and a controller 23. The display section 21 which is, for example, a touch panel displays the setting information and the like. The input section 22 which is, for example, a touch panel receives the input of the user. The controller 23 includes a storage section 231 and a processor 232 and controls the whole of the server 2.

The display apparatus 3 is provided with a portable terminal 4 and a smart glass 5. Communication is carried out between the portable terminal 4 and the server 2, for example, in a wireless manner.

The portable terminal 4 connects with the smart glass 5 in a wired manner and may communicate with the smart glass 5 in a wired manner. The portable terminal 4 may supply power to the smart glass 5 in a wired manner. The user may mount the smart glass 5 to the head and carry the portable terminal 4. The portable terminal 4 includes a display section 41, an input section 42, an acquisition section 43 and a controller 44. The display section 41 which is, for example, a touch panel displays the setting information and the like. The input section 42 which is, for example, a touch panel receives the input of the user. The acquisition section 43 is equipped with, for example, GPS (Global Positioning System) to acquire position information of the display apparatus 3. The acquisition section 43 is also equipped with an altimeter to acquire the height of the display apparatus 3 as well. The acquisition section 43 may acquire radio waves of a beacon to acquire the position information of the display apparatus 3. The smart glass 5 photographs outside world and a marker arranged on a pillar or a wall, and the acquisition section 43 may acquire the position information of the display apparatus 3 according to the captured image acquired from the smart glass 5. The controller 44 includes a storage section 441 and a processor 442 and controls the whole of the portable terminal 4.

The smart glass 5 (mounting device) is an eyeglass shape and mounted to the head of a user. The smart glass 5 includes a holding member 51, an optical member 52, a projection section 53, an image capturing section 54 and a controller 55. The holding member 51 has the same shape as the frame of the eyeglass and holds elements 52-55. There is a pair of optical members 52. The optical members 52 each are in front of both eyes of the user. The optical members 52 each transmit light of the outside world (background image information described later of the sheet). One of the optical members 52 reflects extraction image information described later projected by the projection section 53. The projection section 53 projects the extraction image information to one of the optical members 52. In this way, in a state in which the extraction image information is overlapped with the background image information of the sheet, the user can confirm the extraction image information by sight. The image capturing section 54 equipped with a CCD photographs outside world in a direction identical to line of sight of the user. The controller 55 includes a storage section 551 and a processor 552 and controls the whole of the smart glass 5.

Hereinafter, a display processing carried out by the display system 100 is described with reference to FIG. 2. Processing of the following elements 1-3 is carried out while the processors 162, 232, 442, 552 read programs in the storage sections 161, 231, 441, 551.

(Processing of the Image Forming Apparatus 1)

The image forming apparatus 1 is provided with a first copy mode and a second copy mode. In the first copy mode, the image forming apparatus 1 forms scanned scan image information on a sheet. In the second copy mode, the image forming apparatus 1 forms background image information obtained by excluding extraction image information in a color region from the scan image information on the sheet.

The image forming apparatus 1 sets the copy mode according to input of the user received by the input section 14. In the present embodiment, it is assumed that the image forming apparatus 1 sets the copy mode to the second copy mode (Act 11).

The image forming apparatus 1 acquires identification information of the user when the user holds an ID card over a card reader (the acquisition section 15) (Act 12). The image forming apparatus 1 sends the identification information of the user to the server 2 (Act 13) and then receives an authentication result (Act14).

The image forming apparatus 1 reads the image of the sheet through the reading section 11 in a case in which the user is admitted (YES in Act 15) and then generates the scan image information (Act 16).

The image forming apparatus 1 extracts the extraction image information corresponding to a preset condition from the scan image information, and meanwhile generates the background image information obtained by excluding the extraction image information from the scan image information (Act 17). The extraction image information is not printed. The following condition is considered as an extraction condition of the extraction image information.

color image information (different color image information) of a color (second color) other than black (first color) with respect to image information of black.

text.

image information in a setting region of the scan image information.

In a case in which the extraction condition is the text, the image forming apparatus 1 carries out an OCR (Optical Character Recognition) processing for the scan image information to extract the text. In a case in which the extraction condition is the image information in the setting region, a region in which important information is recorded can be set to the setting region on a sheet printed in a predetermined form. For example, on a sheet printed with a medical record, a region in which information (name, address and diagnosis result by a doctor) of a patient is recorded can be set to the setting region. For example, on a meeting document, a region in which information that does not hope to be seen by meeting partners outside the meeting place is recorded can be set to the setting region.

The image forming apparatus 1 forms the background image information, the identification information (the first identification information) of the sheet and orientation information illustrating orientation of the sheet on the sheet (Act 18). The identification information and the orientation information may be two-dimensional codes such as QR (Quick Response) codes or proper symbols. The identification information and the orientation information may be separately formed by proper symbols. The forming positions of the identification information and the orientation information may or may not be overlapped with the background image information. The image forming apparatus 1 may form the background image information, the identification information of the sheet and the orientation information with a single color (e.g. black). In the present embodiment, it is assumed that position coordinates of the two-dimensional codes (the identification information and the orientation information) are predetermined. The position coordinates of the two-dimensional codes are set in the server 2 and the portable terminal 4 in advance.

The image forming apparatus 1 sends information of the sheet and information relating to the extraction image information that is not printed to the server 2 (Act 19). The information of the sheet contains size of the sheet, orientation in which the image forming apparatus 1 reads the sheet and the identification information. The information relating to the extraction image information contains, for example, the color image information, text information and image information in the setting region of the scan image information as the extraction image information. The information relating to the extraction image information contains position coordinates of the extraction image information in the sheet, identification information in the sheet and the position coordinates of the orientation information.

(Processing of the Display Apparatus 3)

The portable terminal 4 acquires an authentication key (second identification information) registered in the smart glass 5 from the smart glass 5 and sends the authentication key to the server 2. The portable terminal 4 receives the approval from the server 2 (Act 31).

The user observes that the sheet on which the image forming apparatus 1 forms the background image information passes through the smart glass 5.

The smart glass 5 photographs the identification information and the orientation information (the two-dimensional codes) with the image capturing section 54. The portable terminal 4 acquires the identification information and the orientation information via the smart glass 5 (Act 32).

The portable terminal 4 acquires position information containing the height of the display apparatus 3 (Act 33).

The portable terminal 4 sends the identification information, the orientation information and the position information to the server 2 at any time (Act 34).

The portable terminal 4 receives the extraction image information from the server 2 (Act 35).

The portable terminal 4 controls the display apparatus 3 to project the extraction image information from the projection section 53 to the optical member 52 in order to enable the user to confirm the extraction image information in a state of overlapping with the background image information by sight (Act 36).

In this way, the user can view the extraction image information that is not printed on the sheet through the display apparatus 3, and image information identical to the scan image information.

The portable terminal 4 calculates orientation of the sheet and a distance to the sheet according to the identification information or the orientation information (the two-dimensional code). The portable terminal 4 calculates a display position of the extraction image information according to the position of the identification information or the orientation information (the two-dimensional code), the orientation of the sheet and the distance to the sheet. The portable terminal 4 calculates a display magnification of the extraction image information according to the distance to the sheet. The portable terminal 4 controls display operations of the extraction image information in the smart glass 5 on the basis of the calculated display position and display magnification of the extraction image information.

(Processing of the Server 2)

The server 2 receives the identification information of the user from the image forming apparatus 1 (Act 21). The server 2 carries out a user authentication and sends the authentication result to the image forming apparatus 1 (Act 22).

The server 2 receives the information of the sheet (the size of the sheet, the orientation in which the image forming apparatus 1 reads the sheet and the identification information) and the information (the extraction image information, the position coordinate of the extraction image information in the sheet, the identification information in the sheet and the position coordinate of the orientation information) relating to the extraction image information from the image forming apparatus 1 (Act 23). The server 2 associates the size of the sheet, the orientation in which the image forming apparatus 1 reads the sheet, the extraction image information, the position coordinate of the extraction image information in the sheet, the identification information in the sheet and the position coordinate of the orientation information with the identification information of the sheet in the storage section 231.

The server 2 receives the authentication key registered in the smart glass 5 from the portable terminal 4 to carry out a device authentication (Act 24).

The server 2 acquires the identification information of the sheet, the position information and the orientation information from the portable terminal 4 (Act 25).

If receiving the identification information of the sheet from the portable terminal 4, the server 2 sends the extraction image information associated with the identification information of the sheet to the portable terminal 4 (Act 26).

At this time, the server 2 restricts the extraction image information to be sent according to a setting condition. The setting condition is registered in the storage section 231.

For example, the following setting condition is considered.

In a case in which the position of the smart glass 5 (the portable terminal 4) is outside the setting region, the server 2 does not send the extraction image information. It is exemplified as the setting region that the smart glass 5 or the portable terminal 4 is positioned inside the office of the company or within a radius value set from the image forming apparatus 1 that prints the background image information. The position of the image forming apparatus 1 is pre-registered in the storage section 231.

The server 2 does not send the extraction image information according to levels of the authentication keys registered in the smart glass 5. The levels are divided for each authentication key in advance, and allowance/disallowance of the sending of the extraction image information is set for each level.

Further, the server 2 may send the processed extraction image information to the portable terminal 4. For example, in a case in which the extraction image information is the text, the server 2 may translate the text (a first text) according to a translation setting and send the translated text (a second text) to the portable terminal 4 as the extraction image information. Languages to be translated may be set in the translation setting. For example, in a case in which the text is Japanese, the translation setting is used to translate the text into English. The translation setting may be carried out on the basis of the position information (country and area) of the smart glass 5 (the portable terminal 4). For example, the translation setting may be used to translate the text into an official language of a country where the position information of the smart glass 5 is arranged.

The display system 100 extracts image information in a color region from the scanned image at the time of a copy processing, and enables the user to confirm the image information in the color region by sight with the smart glass 5 as the extraction image information. In this case, as the display system 100 prints the background image information obtained by excluding the image information in the color region, the background image information only in black is printed, thereby suppressing the cost of printing.

The display system 100 extracts image information in a region of the sheet on which important information is recorded, and enables the user to confirm the important image information by sight with the smart glass 5 as the extraction image information. In this case, the display system 100 prints the background image information obtained by excluding the important image information, and thus the risk of information leakage can be reduced.

The display system 100 can restrict the sending of the extraction image information according to the position information of the smart glass 5 (the portable terminal 4). For example, only when the user is inside the office of the own company, the display system 100 can send the extraction image information to the smart glass 5 (the portable terminal 4) of the user. Further, as the display system 100 also acquires the height of the display apparatus 3, even when the office is inside the building, accuracy of the restriction based on the position information can be excellent. Thus, through the display system 100, the risk of the information leakage can be reduced.

The display system. 100 extracts the text, and can translate the extracted text on the basis of the position information of the smart glass 5. The display system 100 can enable the user to confirm the translated text by sight with the smart glass 5 as the extraction image information, which is convenient.

(Modification)

The image forming apparatus 1 may send not only the extraction image information, but also the scan image information and the background image information to the server 2.

The portable terminal 4 may carry out part of the processing of the server 2. For example, the portable terminal 4 may carry out the translation of the text.

The extraction condition of the extraction image information and a condition of restricting the sending of the extraction image information to the display apparatus 3 may be combinations of a plurality of conditions.

In the foregoing embodiment, the image forming apparatus 1 carries out the extraction processing at the time of the copy processing; however, the image forming apparatus 1 may send the scan image information to the server 2 after scanning in the copy processing. The server 2 may extract the extraction image information from the scan image information to generate the background image information. The server 2 sends the background image information to the image forming apparatus 1, and the image forming apparatus 1 may print the background image information.

Though the processing at the time of the copying is described in the foregoing embodiment, a processing at the time of the printing can also be carried out similarly to the copy processing. For example, the server 2 may receive a print job from a PC (Personal Computer) and generate the background image information while extracting the extraction image information from the image information in the print job. The server 2 may enable the image forming apparatus 1 to print the background image information and meanwhile send the extraction image information to the smart glass 5 (portable terminal 4).

The smart glass 5 (the display apparatus 3) may not be a monocular type that displays the extraction image information only to one eye of one side and may be a binocular type that displays the extraction image information to both eyes of both sides. The smart glass 5 may enable the user to confirm the extraction image information by sight with the use of a transmission-type display, or scan the retina of the user with a laser to enable the user to confirm the extraction image information by sight. The smart glass 5 may enable the user to confirm the extraction image information by sight with a proper method.

The reading section 11 may be equipped with a CCD for R, a CCD for G, a CCD for B and a CCD for K, or may be a constitute of reading an image in monochrome.

As stated above in detail, according to the technology recorded in the specification, a technology of cooperating with the smart glass in print can be provided.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A method, comprising:
   receiving, by a server device comprising a processor, extraction image information and first identification information from an image forming apparatus which generates background image information based on excluding the extraction image information corresponding to a preset condition from a scan image information generated by reading a sheet and forming the background image information and a symbol as the first identification information on the sheet; and
   sending, by the server device, the extraction image information to a head-mounted display apparatus in response to receiving the first identification information from the head-mounted display apparatus, reading the symbol on the sheet on which the background image information and the symbol are formed, the head-mounted display apparatus with which a user can confirm the extraction image information in a state of overlapping with the background image information on the sheet at the original position by sight.

2. The method according to claim 1, further comprising acquiring, by the server device, position information of the head-mounted display apparatus from the head-mounted display apparatus and restricting sending of the extraction image information based on the position information.

3. The method according to claim 2, wherein the position information contains a height.

4. The method according to claim 1, further comprising acquiring, by the server device, second identification information of the head-mounted display apparatus from the head-mounted display apparatus and restricting sending of the extraction image information according to the second identification information.

5. The method according to claim 1, further comprising translating, by the server device, a first text which is the extraction image information into a set language and sending, by the server device, the translated second text to the head-mounted display apparatus as the extraction image information.

6. A method, comprising:
   receiving, by a server comprising a processor, a scan image information from an image forming apparatus reading a sheet;
   excluding, by the server device, the extraction image information corresponding to a preset condition from the scan image information;
   generating, by the server device, a background image information based on excluding the extraction image information from the scan image information;
   generating, by the server device, an identification information according to the extraction image information;
   sending, by the server device, the background image information and the identification information to the image forming apparatus which forms the background image information and a symbol as the identification information on a sheet;
   sending, by the server device, the extraction image information to a head-mounted display apparatus in response to receiving the identification information from the head-mounted display apparatus reading the symbol on the sheet on which the background image information and the symbol are formed, the head-mounted display apparatus with which a user can confirm the extraction image information in a state of overlapping with the background image information on the sheet at the original position by sight.

* * * * *